United States Patent
Joffe et al.

(10) Patent No.: US 11,507,560 B2
(45) Date of Patent: *Nov. 22, 2022

(54) MUTABLE DATA INGESTION AND STORAGE

(71) Applicant: ActionIQ, Inc., New York, NY (US)

(72) Inventors: Nitay Joffe, New Rochelle, NY (US); Panagiotis Mousoulis, Astoria, NY (US)

(73) Assignee: ActionIQ, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/361,820

(22) Filed: Jun. 29, 2021

(65) Prior Publication Data

US 2022/0107932 A1  Apr. 7, 2022

Related U.S. Application Data

(63) Continuation of application No. 17/061,754, filed on Oct. 2, 2020, now Pat. No. 11,080,264.

(51) Int. Cl.
*G06F 16/23* (2019.01)

(52) U.S. Cl.
CPC ........ *G06F 16/235* (2019.01); *G06F 16/2358* (2019.01)

(58) Field of Classification Search
CPC .......................... G06F 16/235; G06F 16/2358
See application file for complete search history.

(56) References Cited

U.S. PATENT DOCUMENTS

| | | | |
|---|---|---|---|
| 9,753,935 B1 | 9/2017 | Tobin | |
| 10,320,879 B2 | 6/2019 | Nekrestyanov | |
| 10,942,912 B1* | 3/2021 | Evenson | G06F 16/2358 |
| 2012/0209886 A1* | 8/2012 | Henderson | G06F 16/211 |
| | | | 707/798 |
| 2013/0086131 A1 | 4/2013 | Hunt | |
| 2013/0110766 A1* | 5/2013 | Promhouse | G06F 16/2365 |
| | | | 707/607 |
| 2015/0121352 A1 | 4/2015 | Dawson | |

(Continued)

FOREIGN PATENT DOCUMENTS

EP  3128445 A1  2/2017

OTHER PUBLICATIONS

Extended European Search Report issued in App. No. EP21199802.6, dated Feb. 25, 2022, 9 pages.

*Primary Examiner* — James Trujillo
*Assistant Examiner* — Michal Bogacki
(74) *Attorney, Agent, or Firm* — Butzel Long

(57) ABSTRACT

Systems and techniques are provided for mutable data ingestion and storage. Data for a database may be received at a computing device. New data from the data for the database may be stored as a mutable data chunk. The data for the database may be determined to include updated data for a previously stored mutable data chunk. The updated data may be applied to the previously stored mutable data chunk to update the previously stored mutable chunk. A second previously stored mutable data chunk may be determined to have been initially stored a specified amount of time ago. In response to determining that the second previously stored mutable data chunk was initially stored the specified amount of time ago, the second previously stored mutable data chunk may be caused to become an immutable data chunk.

20 Claims, 16 Drawing Sheets

(56) References Cited

U.S. PATENT DOCUMENTS

| | | | |
|---|---|---|---|
| 2016/0357828 A1* | 12/2016 | Tobin | G06F 16/2477 |
| 2017/0285975 A1 | 10/2017 | Trika | |
| 2019/0102154 A1* | 4/2019 | Koupy | G06F 11/3433 |
| 2019/0102416 A1 | 4/2019 | Zhang | |
| 2019/0129844 A1 | 5/2019 | Zhang | |
| 2019/0253452 A1* | 8/2019 | Latapie | H04W 84/18 |
| 2020/0341659 A1 | 10/2020 | Chauhan | |
| 2020/0364201 A1* | 11/2020 | Cseri | G06F 16/235 |

* cited by examiner

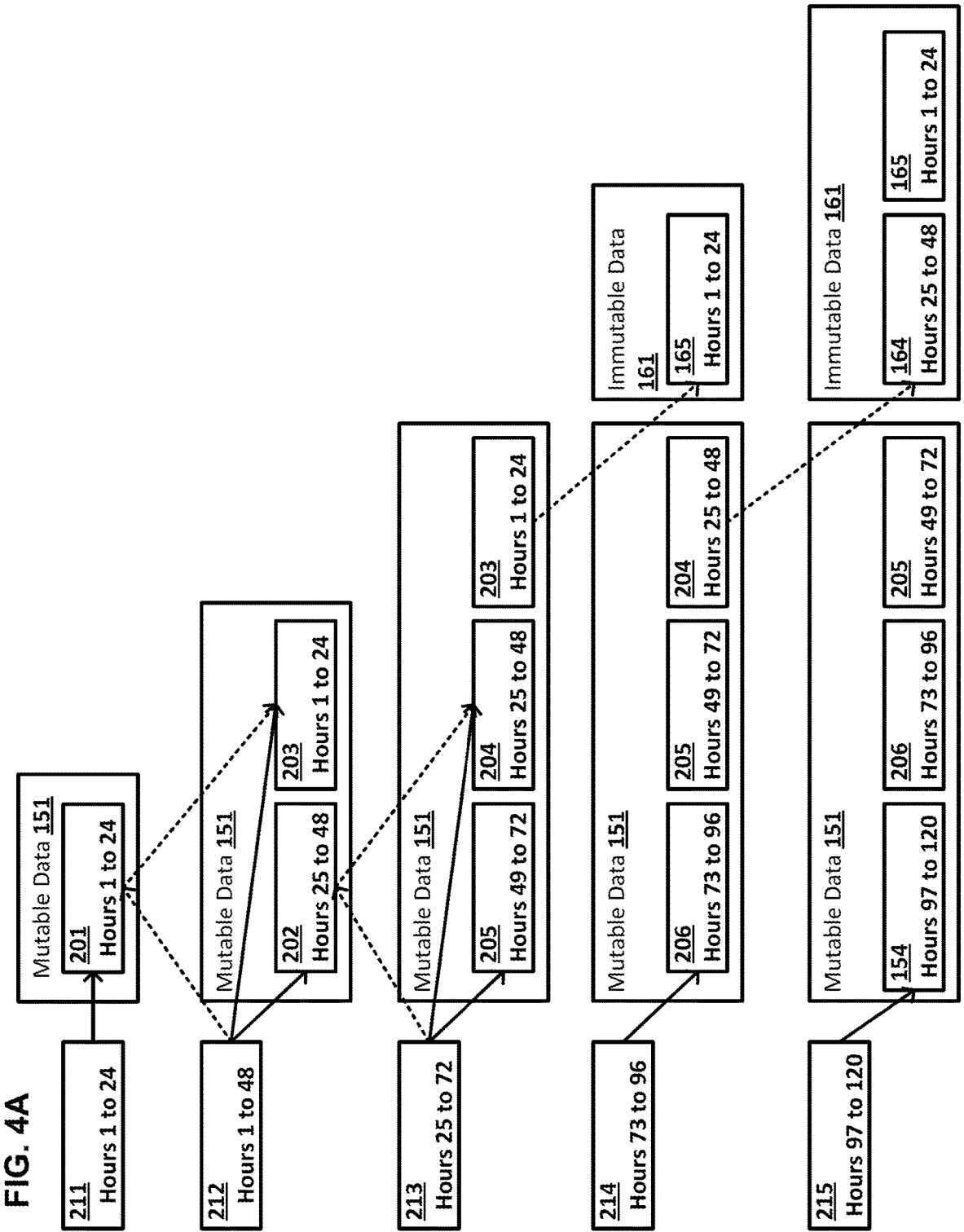

MUTABLE DATA INGESTION AND STORAGE

BACKGROUND

Data for a database ingested by a database system may be mutable. The mutable data may be updated or replaced based on later received data. Using snapshot updates to the data may not allow the data to be mutable. Using delta updates may result in inefficient loading of the data when the data is queried.

BRIEF SUMMARY

According to implementations of the disclosed subject matter, data for a database may be received at a computing device. New data from the data for the database may be stored as a mutable data chunk. The data for the database may be determined to include updated data for a previously stored mutable data chunk. The updated data may be applied to the previously stored mutable data chunk to update the previously stored mutable chunk. A second previously stored mutable data chunk may be determined to have been initially stored a specified amount of time ago. In response to determining that the second previously stored mutable data chunk was initially stored the specified amount of time ago, the second previously stored mutable data chunk may be caused to become an immutable data chunk.

Systems and techniques disclosed herein may allow for mutable data ingestion and storage. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4A shows an example visualization suitable for mutable data ingestion and storage according to an implementation of the disclosed subject matter.

DETAILED DESCRIPTION

Figure 1:
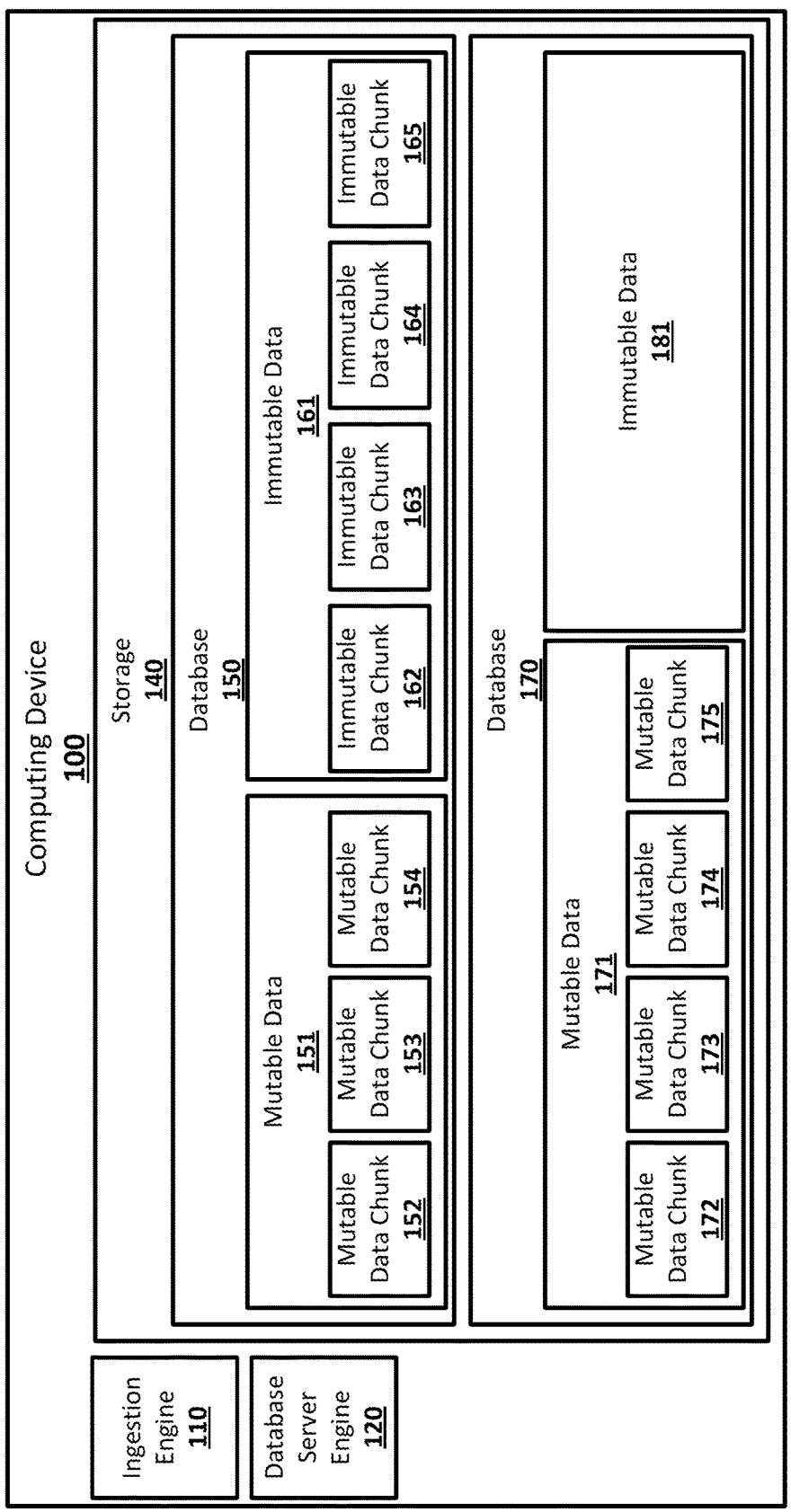
FIG. 1 shows an example system suitable for mutable data ingestion and storage according to an implementation of the disclosed subject matter.

According to embodiments disclosed herein, mutable data ingestion and storage may be used to ingest and store mutable data and allow for efficient updating and querying of the data. Data that includes database tables may be received to be ingested. Received data may be stored as mutable data. The mutable data may be hot data in the database system. Some of the received data may include updates to previously stored mutable data, and may be used to update the previously stored mutable data. After a specified period of time, the stored mutable data may become immutable data. The immutable data may be cold data in the database system. A union operation may be used to make the database tables stored in the hot data and cold data available to be queried by the database system. The union operation may be performed on the hot data and the cold data after a merge operation is performed on the hot data. The union of the hot data and the cold data may be made available for querying.

Data that includes database tables may be received to be ingested. The data may be received at a database system that may include a database server engine for querying data. The database system may be implemented using any suitable number and type computing devices. The data may include data for database tables in any suitable format. The data may be received in any suitable manner from any suitable source of data. For example, the data may be received through a local or wide area network connection between a computing device or system that stores the data and the database system, or may be received on a suitable non-volatile storage medium that may be accessed by the database system. The data may be any suitable data for database tables, such as, for example, event data such as clickstream data. The data may be in the form of, for example, records for database tables. Each record in the data may be, for example, a row of a database table. The data may also include schema for the database tables. The data received at the database system may include records that update records from previously received data.

The data may be stored as mutable data. To start ingesting the data, the data received at the database system may be stored as mutable data. Data stored as mutable data may be hot data in the database system. Any mutable data stored by the database system may be updateable based on later received data. Some of the received data may include updates to previously stored mutable data, and may be used to update the previously stored mutable data on the database system. The update may be, for example, a snapshot update in which the portion of the received data with updated data for the previously stored mutable data replaces a portion of the previously stored mutable data. For example, the mutable data stored on the database system may include records of events for a 24-hour period. Received data may include records for events from that same 24-hour period that update or remove records already stored in the mutable data, for example, changing the data stored in a record based on updated information about the event represented by the record, or removing a record for an event. The records of the events for the 24-hour period already stored on the database system as mutable data may be replaced with the records of events for that 24-hour period in the received data.

After a specified period of time, the stored mutable data may become immutable data. Mutable data stored on the database system may become immutable data at regular intervals. For example, whether some portion of the mutable data should become immutable data may be determined every 24 hours. The mutable data that becomes immutable data may be mutable data that was initially stored a specified amount of time ago, regardless of how often the mutable data has been updated in the intervening time. For example, every 24 hours it may be determined whether any mutable data was initially received and stored 30 days ago, and any such mutable data may become immutable data. This may result in the mutable data, or hot data, for a database including, at most, the most recent 30-days' worth of data, while all other data for the database is stored as immutable data, or cold data. The intervals at which the determination is made as to whether some mutable data becomes immutable data may be any suitable length. For example, the intervals may be an hour long, a day long, or a week long. The interval may be set based on, for example, the intervals at which new data is received at the database system to be stored as mutable data. For example, if data is received once an hour, the interval at which the determination of whether mutable data should become immutable data may also be once an hour, resulting in the period of time covered by the mutable data remaining constant when measured on an hourly basis. The determination as to whether mutable data should become mutable data may also, for example, be tied directly to the receiving and storing of new mutable data, such that that the storing of new mutable data triggers the determination.

The specified amount of time ago mutable data was initially received before becoming immutable data may be any suitable amount of time, and may be greater than the interval at which the determination of whether mutable data should become immutable data to ensure that some amount of data is always stored as mutable data. For example, if the interval is set to one hour, the specified amount of time may be greater than one hour, for example, five hours, ensuring that there is always some mutable data as long as new data to be stored as mutable data is received at a minimum of once every five hours. In some implementations, the specified amount of time may be shorter than the interval. This may result in periods of time where no data is stored as mutable data even if new data to be stored a mutable data is received frequently, as previously stored mutable data may become immutable data faster than new data is received and stored as mutable data.

Newly received data may be stored as mutable data and older mutable data may become immutable data in any suitable order. For example, new data may be received at the same interval at which mutable data becomes immutable data. When new data is received, mutable data that was received the specified amount of time ago may become immutable data after the new data is stored as mutable data, or the new data may be stored as mutable data after the mutable data that was received the specified amount of time ago becomes immutable data. The mutable data may be stored in a buffer, and may be shifted in the buffer in a first-in-first-out manner whenever new data is received and stored as mutable data. The storing of newly received data as mutable data may be handled by a mutable data process, and the conversion of mutable data to immutable data may be handled by an immutable data process. The mutable data process and immutable data process may be separate processes, or separate threads of the same process, and may run independently of each of other, but may communicate between themselves or monitor each other to ensure that the ordering of the storing of mutable data and of mutable data becoming immutable data is maintained.

The immutable data may not be subject to updating based on later received data. Once mutable data has become immutable data, records in the immutable data may not be updated or removed. Any updates to, or removal of, records that have become immutable may be ignored. For example, if received data includes updates to records that are part of the immutable data and updates to records that are part of the mutable data, only the records that are part of the mutable data may be updated based on the received data, for example, through a snapshot update to the mutable data being updated. The portion of the received data that updates the immutable data may be discarded, as the immutable data may not be updateable.

A union operation may be used to make the hot data and cold data available to be queried by the database system. The union operation may be performed on the mutable data, or hot data, and the immutable data, or cold data, after a merge operation is performed on the hot data. The mutable data may be merged to ensure that any newly received data that updates or removes records already stored in the mutable data is included in the union of the mutable data and the immutable data, as the newly received data may include an update to data already stored in the mutable data. The immutable data may be stored as a single data chunk which may not require any operations to be performed on it before it is joined with the mutable data via a union operation. The immutable data may also be stored as separate chunks which may be joined together using a union operation that appends the chunks together, as the chunks of immutable data may be disjoint, each covering a separate period of time, allowing them to be joined efficiently with a union operation.

The union of the mutable data and the immutable data, or hot data and cold data, may be made available by the database system for querying by any suitable database server engine. The union of the mutable data and the immutable data may be a materialization of the database that includes mutable data and immutable data. This materialization may include, for example, any number of database tables formed from the mutable data and immutable data, including any schemas. The database server engine may be unaware that the data being queried is the result of a union between mutable data and immutable data, as the union of the mutable data and immutable data may appear to the database server engine as a single chunk of data, for example, a single materialized database with database tables. For example, a database table in the union of the immutable data and the mutable data may have some records that are stored as part of the immutable data and some records that are stored as part of the mutable data. The database server engine, when querying the database table, may be unable to distinguish between records of the database table that are stored as part of the mutable data and records of the database table that are stored as part of the immutable data.

FIG. 1 shows an example system suitable for mutable data ingestion and storage according to an implementation of the disclosed subject matter. A computing device 100 may include an ingestion engine 110, a database server engine 120, and storage 140. The computing device 100 may be any suitable device, such as, for example, a computer 20 as described in FIG. 9, for implementing the ingestion engine 110, the database server engine 120, and the storage 140. The computing device 100 may be a single computing device, or may include multiple connected computing devices, and may be, for example, a laptop, a desktop, an individual server, a server farm, or a distributed server system, or may be a virtual computing device or system. The computing device 100 may be part of a computing system and network infrastructure, or may be otherwise connected to the computing system and network infrastructure. The ingestion engine 110 may be any suitable combination of hardware and software for ingesting data received at the computing device 100. The database server engine 120 may be any suitable combination of hardware and software for querying database tables that are in a format compatible with the database server engine 120. The storage 140 may be any suitable combination of hardware and software for implementing any suitable combination of volatile and non-volatile storage, which may store data for the computing device 100.

The ingestion engine 110 may be any suitable combination of hardware and software for ingesting data received at the computing device 100. The ingestion engine 110 may receive data received at the computing device 100, and may ingest the data by processing the data and storing the data as data chunks in the storage 140. Data received at the ingestion engine 110 may be stored as mutable data, or hot data, and used to update already stored mutable data, for example, being applied as a snapshot update to the already stored mutable data. For example, ingestion engine 110 may store received data for database tables of the database 150 as part of mutable data 151. The mutable data 151 may include data that may be considered mutable, with records that may be updated or removed based on later received data. The ingestion engine 110 may also cause data from the mutable data 151 to become immutable data, or cold data, at specified intervals. For example, at a specified interval, the ingestion engine 110 may determine whether any data was initially stored in the mutable data 151 a specified amount of time ago, regardless of intervening updates, and cause any such mutable data to become immutable data, stored with the immutable data 161. The ingestion engine 110 may, for example, physically copy data from a buffer that stores the mutable data 151 to a separate area of storage that may be used for the immutable data 161, or may change a designation of the data from the mutable data 151 to indicate that it is now immutable, for example, in metadata for the mutable data, may change pointers used to indicate which data in the database 150 is part of the mutable data 151 and which data is part of the immutable data 161, or may cause the data from the mutable data 151 to become immutable data in any other suitable manner.

The ingestion engine 110 may also prepare data in the storage 140 for querying by the database server engine 110. The ingestion engine 110 may, for example, make database tables from the database 150 available for querying by the database server engine 110 by performing a union operation on the results of performing a union operation on data of the immutable data 161 and performing a merge operation on data of the mutable data 151. This may result in all of the data for the database tables of the database 150 being joined together in a materialized database, allowing queries to be run against the database tables of the database 150 by the database server engine 120. The materialized database for the database table 150 may be stored in the storage 140.

The data in the storage 140 may be stored in data chunks. A data chunk may be a file, group of files, or other discrete partition of data. The data chunks stored and updated by the ingestion engine 110 may remain stored in the storage 140 until, for example, they are purposefully deleted. Mutable data chunks may be updated by the ingestion engine 110, while immutable data chunks may not be updatable by the ingestion engine 110.

The database server engine 120 may be any suitable combination of hardware and software for querying database tables that are in a format compatible with the database server engine 120. The database server engine 120 may, for example, be any available database server engine, such as a MySQL or Apache Spark™ database server engine. The database server engine 120 may query database tables from a database of the storage 140 that are in a format that is compatible with the database server engine 120 and have been made available for querying by the ingestion engine 110. The database server engine 120 may, for example, run a query against a database table to return results, for example, to a user.

The storage 140 may be any suitable storage hardware connected to the computing device 100. For example, the storage 140 may be a component of the computing device, such as a magnetic disk, flash memory module or solid state disk, or may be connected to the computing device 100 through any suitable wired or wireless connection. The storage 140 may be a local storage, i.e., within the environment within which the computing device 100 operates, or may be partially or entirely operated on a remote server. The storage 140 may store databases, such as the databases 150 and 170, which may include data for database tables. Data in a database may be stored as mutable data and immutable data. For example, the database 150 may include the mutable data 151, which may be mutable, or hot data, and the immutable data 161, which may be immutable, or cold data. The database 170 may include the mutable data 171, which may be mutable, or hot data, and the immutable data 181, which may be immutable, or cold data. The data in the mutable data 151 may be stored as data chunks, such as the mutable data chunks 152, 153, and 154, which may each store data, such as records, from a specified amount of time, and the data in the immutable data 161 may be stored as immutable data chunks 162, 163, 164, and 165, which may each store data over the same amount of time as the mutable data chunks. For example, each of the mutable data chunks 152, 153, and 154, and immutable data chunks 162, 163, 164, and 165, may store data, such as records, from a 24-hour period of time. The periods of time of the data stored by the immutable data chunks 162 may be contiguous and disjoint. For example, the immutable data chunks 162, 163, 164, and 165 may together store data from a contiguous 96-hour period of time. The periods of time of the data stored by the mutable data chunks 152, 153, and 154 may also be disjoint. Newly received data may include data that temporally overlaps data stored in the mutable data chunks 152, 153, and 154, and the temporally overlapping data may be used as snapshot updates to the data it overlaps if that data is part of the mutable data 151 and not part of the immutable data 161.

In some implementations, immutable data may be stored as a single data chunk to which data that has just been made immutable by the ingestion engine 110 may be appended. For example, the mutable data 171 of the database 170 may be stored as separate mutable data chunks 172, 173, 174, and 175. The immutable data 181 of the database 170 may be stored as a single, undifferentiated data chunk. When the ingestion engine 110 causes data from the mutable data 171 to become immutable, that data may be appended to the immutable data 181.

Figure 2A:
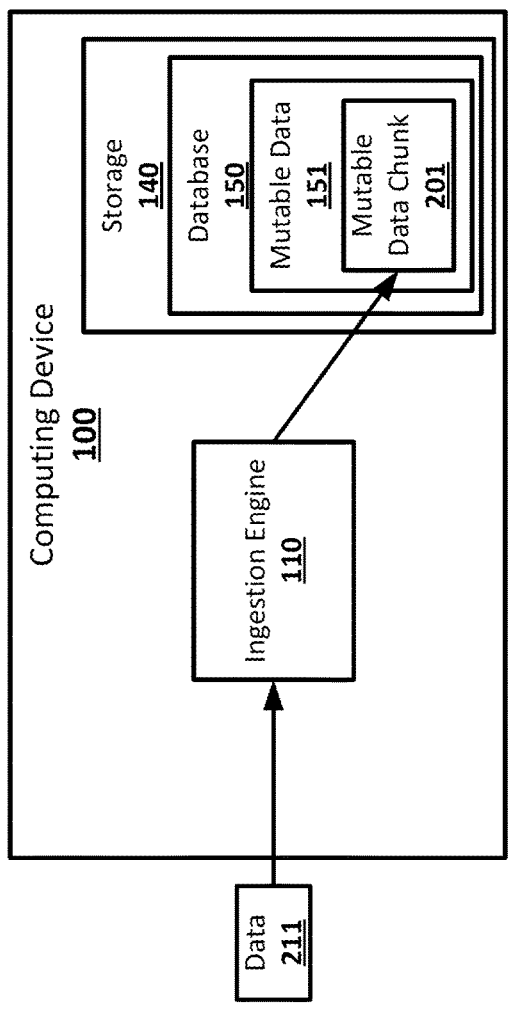
FIG. 2A shows an example arrangement suitable for mutable data ingestion and storage according to an implementation of the disclosed subject matter.

FIG. 2A shows an example arrangement suitable for mutable data ingestion and storage according to an implementation of the disclosed subject matter. Data 211 may be received at the computing device 100. The data 211 may be received from any suitable source, including another computing device or system, or a storage device accessible to the computing device 100. The data 211 may include data, such as records, for database tables of a database. The data 211 may include data from over a specified time period, such as, for example, data from a 24-hour time period. The ingestion engine 110 may receive the data 211, perform any suitable processing on the data 211, and store the data 211 as mutable data chunk 201 which may be part of the mutable data 151 for the database 150. The mutable data chunk 201 may be mutable while part of the mutable data 151, and subject to being updated by the ingestion engine 110 based on subsequently received data. The ingestion engine 110 may also determine that no data in the mutable data 151 was initially stored long enough ago to become immutable data. The specified amount of time ago data may need to have been stored as part of the mutable data 151 before becoming immutable may be, for example, 72 hours. The mutable data chunk 201 may have been stored zero hours ago at the time the ingestion engine 110 stores the mutable data chunk 201 in the storage 140.

Figure 2B:
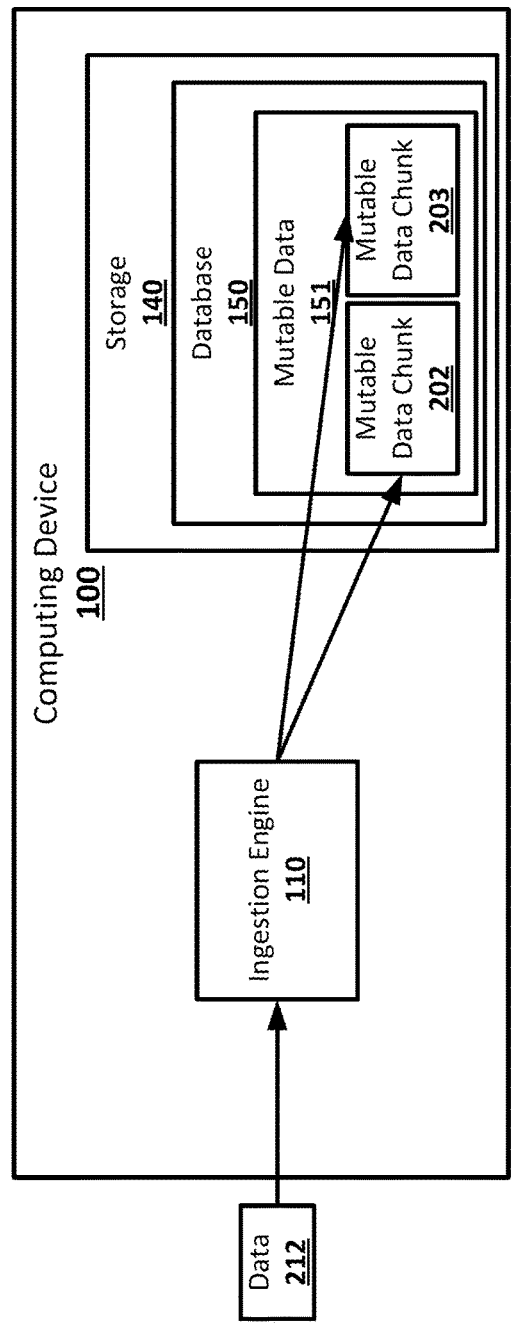
FIG. 2B shows an example arrangement suitable for mutable data ingestion and storage according to an implementation of the disclosed subject matter.

FIG. 2B shows an example arrangement suitable for mutable data ingestion and storage according to an implementation of the disclosed subject matter. Data 212 may be received at the computing device 100. The data 212 may be received from any suitable source, including another computing device or system, or a storage device accessible to the computing device 100, and may be from the same source as the data 211. The data 212 may be received after a specified interval, for example, a 24-hour interval, has passed since the receipt of the data 211. The data 212 may include data, such as records, for database tables of a database, for example, the database 150. The data 212 may include new data for the database 150 from over a specified time period, such as, for example, data from a 24-hour time period, such as the 24-hour time period that follows the 24-time period whose data was included in the data 211, and may also include a snapshot update for the data 211, which may include updated data and may also remove data from the mutable data chunk data 201. The ingestion engine 110 may receive the data 212, perform any suitable processing on the data 212, store the new data from the data 212 as mutable data chunk 202 which may be part of the mutable data 151 for the database 150, and may apply the snapshot update to the mutable data chunk 201, replacing the mutable data chunk 201 with the mutable data chunk 203. The mutable data chunk 203 may include all of the data from the mutable data chunk 201, including data updated by the snapshot update, except for data removed by the snapshot update. For example, the snapshot update may include changes to records in the mutable data chunk 201. These changes may be reflected in the mutable data chunk 203. The snapshot update may remove records from the mutable data chunk 201. These records may be absent from the mutable data chunk 203. The mutable data chunks 202 and 203 may both be mutable and subject to being updated by the ingestion engine 110 while part of the mutable data 151. The ingestion engine 110 may also determine that no data in the mutable data 151 was initially stored long enough ago to become immutable data. The mutable data chunk 203 may have been initially stored 24 hours ago as the mutable data chunk 201, and the mutable data chunk 202 may have been initially stored zero hours ago at the time the ingestion engine 110 stores the mutable data chunk 202 in the storage 140.

Figure 2C:
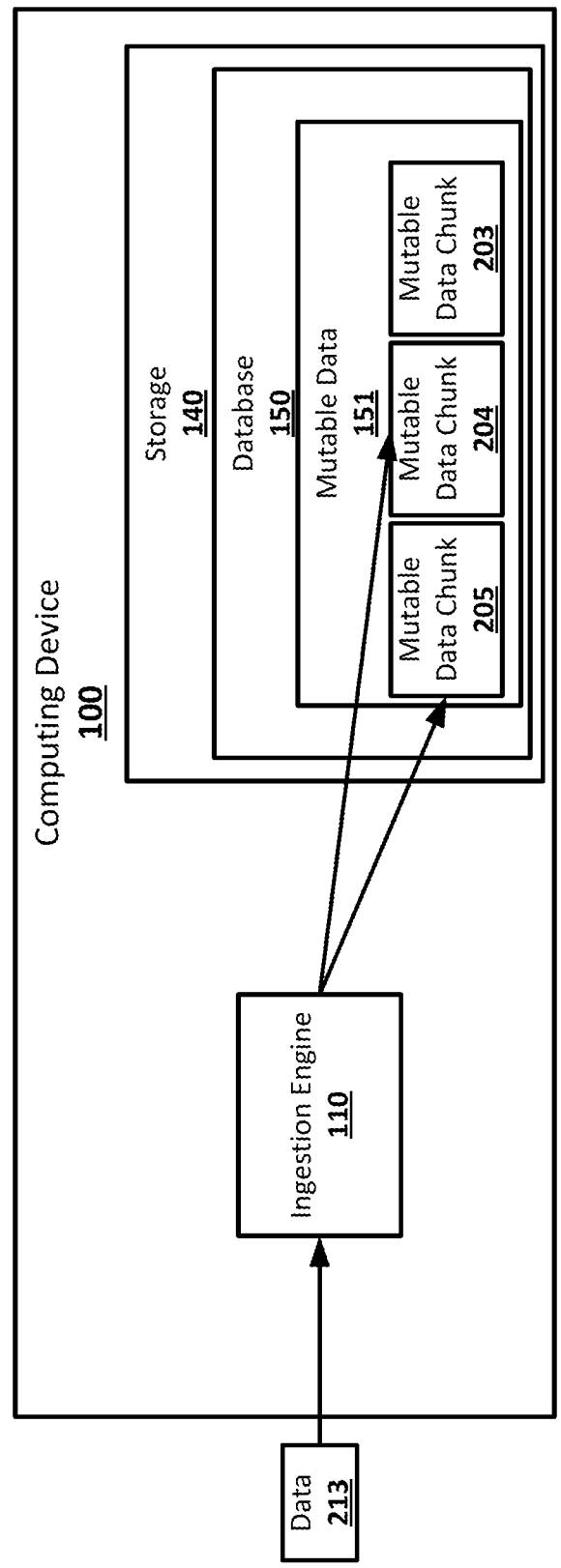
FIG. 2C shows an example arrangement suitable for mutable data ingestion and storage according to an implementation of the disclosed subject matter.

FIG. 2C shows an example arrangement suitable for mutable data ingestion and storage according to an implementation of the disclosed subject matter. Data 213 may be received at the computing device 100. The data 213 may be received from any suitable source, including another computing device or system, or a storage device accessible to the computing device 100, and may be from the same source as the data 211 and data 212. The data 213 may be received after a specified interval, for example, a 24-hour interval, has passed since the receipt of the data 212. The data 213 may include data, such as records, for database tables of a database, for example, the database 150. The data 213 may include new data for the database 150 from over a specified time period, such as, for example, data from a 24-hour time period, such as the 24-hour time period that follows the 24-time period whose data was included in the data 212, and may also include a snapshot update for the data 212, which may include updated data and may also remove data from the mutable data chunk data 202. The ingestion engine 110 may receive the data 213, perform any suitable processing on the data 213, store the new data from the data 213 as mutable data chunk 205 which may be part of the mutable data 151 for the database 150, and may apply the snapshot update to the mutable data chunk 202, replacing the mutable data chunk 202 with the mutable data chunk 204. The mutable data chunk 204 may include all of the data from the mutable data chunk 202, including data updated by the snapshot update, except for data removed by the snapshot update. For example, the snapshot update may include changes to records in the mutable data chunk 202. These changes may be reflected in the mutable data chunk 204. The snapshot update may remove records from the mutable data chunk 202. These records may be absent from the mutable data chunk 204. The mutable data chunks 203, 204, and 205 may all be mutable and subject to being updated by the ingestion engine 110 while part of the mutable data 151. The ingestion engine 110 may also determine that no data in the mutable data 151 was initially stored long enough ago to become immutable data. The mutable data chunk 203 may have been initially stored 48 hours ago as the mutable data chunk 201, the mutable data chunk 204 may have been initially stored 24 hours ago as the mutable data chunk 202, and the mutable data chunk 205 may have been initially stored zero hours ago at the time the ingestion engine 110 stores the mutable data chunk 205 in the storage 140.

Figure 2D:
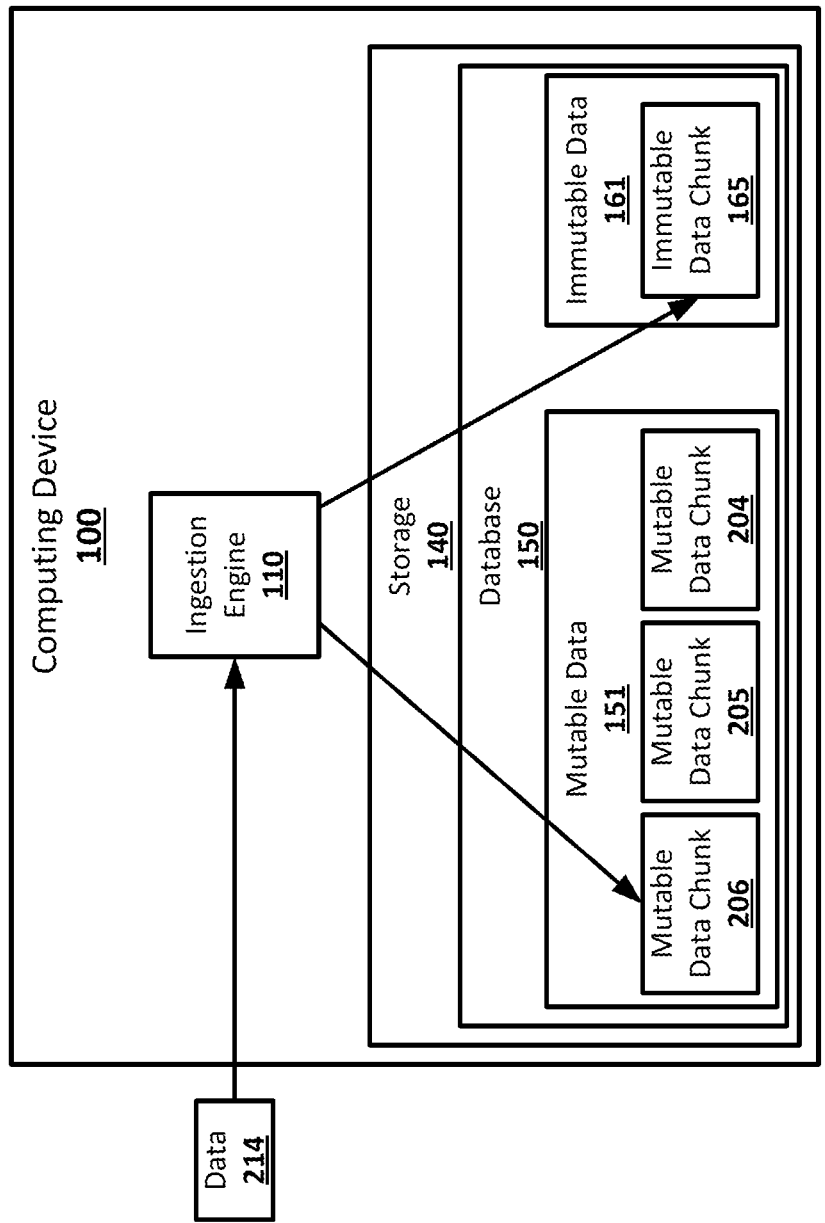
FIG. 2D shows an example arrangement suitable for mutable data ingestion and storage according to an implementation of the disclosed subject matter.

FIG. 2D shows an example arrangement suitable for mutable data ingestion and storage according to an implementation of the disclosed subject matter. Data 214 may be received at the computing device 100. The data 214 may be received from any suitable source, including another computing device or system, or a storage device accessible to the computing device 100, and may be from the same source as the data 211, 212 and 213. The data 214 may be received after a specified interval, for example, a 24-hour interval, has passed since the receipt of the data 213. The data 214 may include data, such as records, for database tables of a database, for example, the database 150. The data 214 may include new data for the database 150 from over a specified time period, such as, for example, data from a 24-hour time period, such as the 24-hour time period that follows the 24-time period whose data was included in the data 213. The ingestion engine 110 may receive the data 214, perform any suitable processing on the data 214, and store the new data from the data 214 as mutable data chunk 206 which may be part of the mutable data 151 for the database 150. The ingestion engine 110 may also determine that the mutable data chunk 203 was initially stored long enough ago to become immutable data. The mutable data chunk 203 may have been initially stored 72 hours ago as the mutable data chunk 201. The ingestion engine 110 may cause the mutable data chunk 203 to become the immutable data chunk 165, for example, through moving or copying the mutable data chunk 203, updating an indicator in metadata for the mutable data chunk 203, changing pointers that point to the mutable data chunk 203, or in any other suitable manner. The immutable data chunk 165 may be part of the of the immutable data 161 for the database 150. The immutable data chunk 165 may no longer be subject to being updated with any data subsequently received at the computing device 100 and processing by the ingestion engine 110. The mutable data chunk 204 may have been initially stored 48 hours ago as the mutable data chunk 202, the mutable data chunk 205 may have been initially stored 24 hours ago, and the mutable data chunk 206 may have been initially stored zero hours ago at the time the ingestion engine 110 stores the mutable data chunk 206 in the storage 140, and may all be mutable and subject to being updated by the ingestion engine 110 while part of the mutable data 151.

Figure 2E:
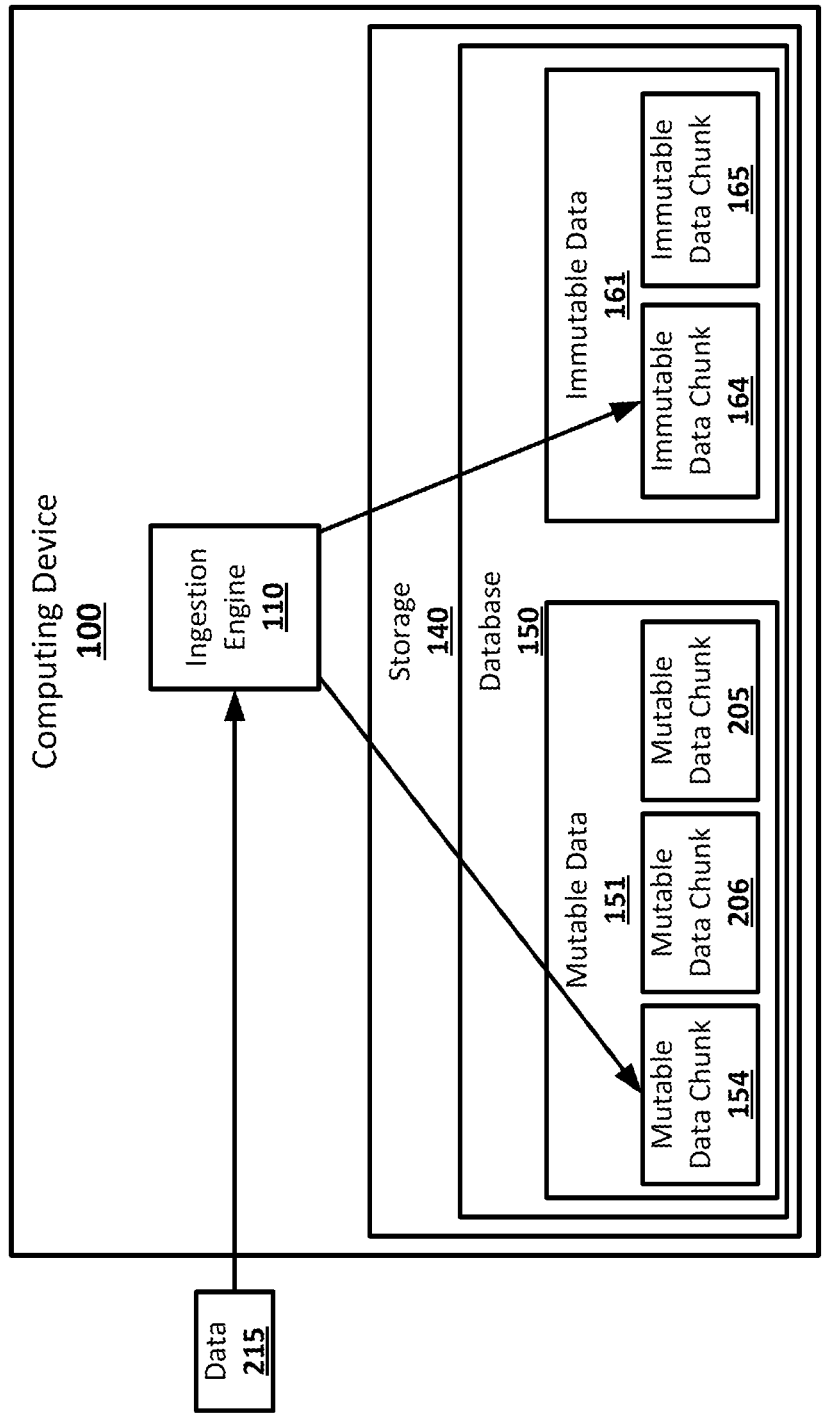
FIG. 2E shows an example arrangement suitable for mutable data ingestion and storage according to an implementation of the disclosed subject matter.

FIG. 2E shows an example arrangement suitable for mutable data ingestion and storage according to an implementation of the disclosed subject matter. Data 215 may be received at the computing device 100. The data 215 may be received from any suitable source, including another computing device or system, or a storage device accessible to the computing device 100, and may be from the same source as the data 211, 212 213, and 214. The data 215 may be received after a specified interval, for example, a 24-hour interval, has passed since the receipt of the data 214. The data 215 may include data, such as records, for database tables of a database, for example, the database 150. The data 215 may include new data for the database 150 from over a specified time period, such as, for example, data from a 24-hour time period, such as the 24-hour time period that follows the 24-time period whose data was included in the data 214. The ingestion engine 110 may receive the data 215, perform any suitable processing on the data 215, and store the new data from the data 215 as mutable data chunk 154 which may be part of the mutable data 151 for the database 150. The ingestion engine 110 may also determine that the mutable data chunk 204 was initially stored long enough ago to become immutable data. The mutable data chunk 204 may have been initially stored 72 hours ago as the mutable data chunk 202. The ingestion engine 110 may cause the mutable data chunk 204 to become the immutable data chunk 164, for example, through moving or copying the mutable data chunk 204, updating an indicator in metadata for the mutable data chunk 204, changing pointers that point to the mutable data chunk 204, or in any other suitable manner. The immutable data chunk 164 may be part of the of the immutable data 161 for the database 150. The immutable data chunk 164 may no longer be subject to being updated with any data subsequently received at the computing device 100 and processing by the ingestion engine 110. The mutable data chunk 205 may have been initially stored 48 hours ago, the mutable data chunk 206 may have been initially stored 24 hours ago, and the mutable data chunk 154 may have been initially stored zero hours ago at the time the ingestion engine 110 stores the mutable data chunk 154 in the storage 140, and may all be mutable and subject to being updated by the ingestion engine 110 while part of the mutable data 151.

Figure 2F:
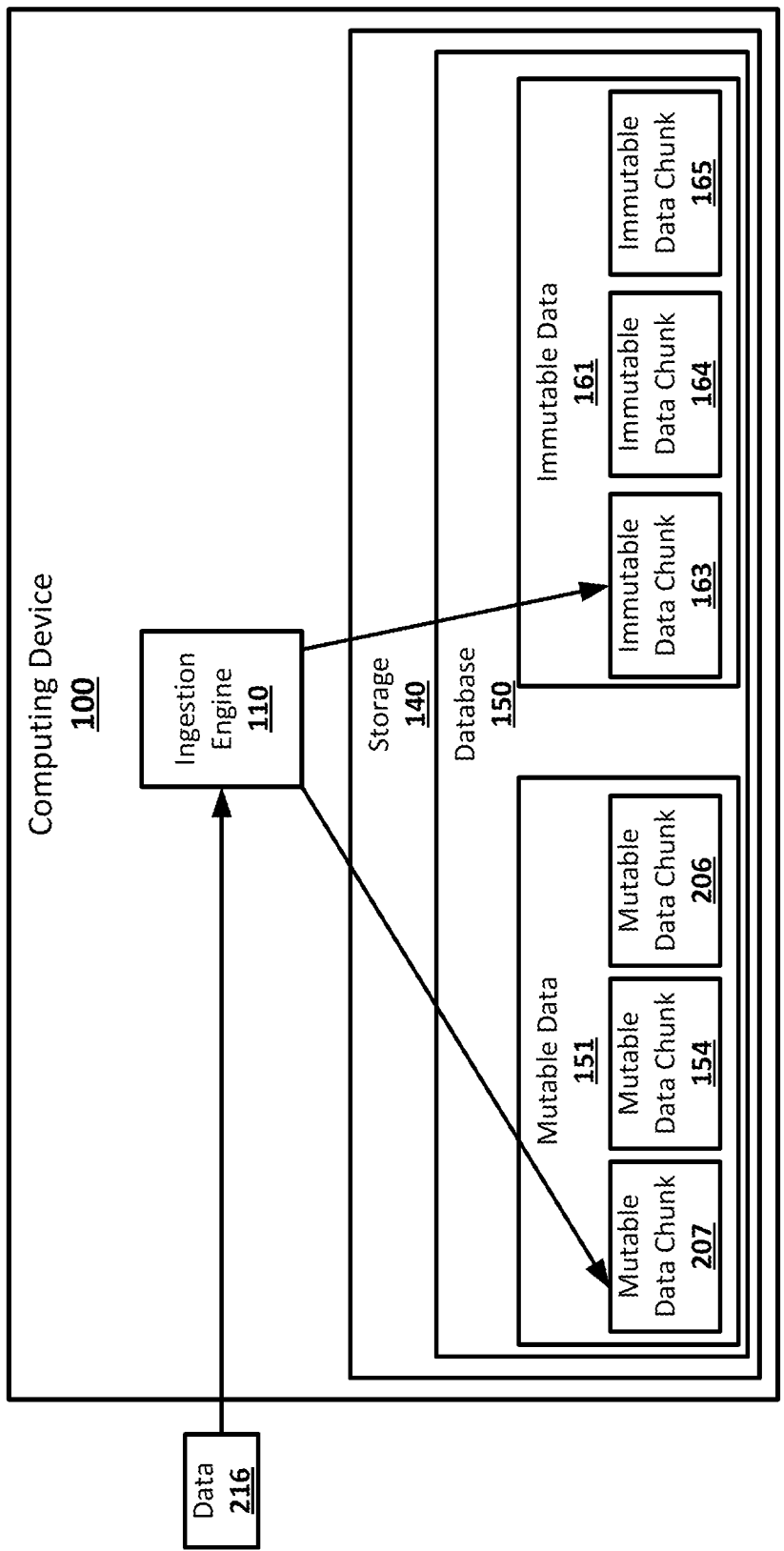
FIG. 2F shows an example arrangement suitable for mutable data ingestion and storage according to an implementation of the disclosed subject matter.

FIG. 2F shows an example arrangement suitable for mutable data ingestion and storage according to an implementation of the disclosed subject matter. Data 216 may be received at the computing device 100. The data 216 may be received from any suitable source, including another computing device or system, or a storage device accessible to the computing device 100, and may be from the same source as the data 211, 212 213, 214, and 215. The data 216 may be received after a specified interval, for example, a 24-hour interval, has passed since the receipt of the data 215. The data 216 may include data, such as records, for database tables of a database, for example, the database 150. The data 216 may include new data for the database 150 from over a specified time period, such as, for example, data from a 24-hour time period, such as the 24-hour time period that follows the 24-time period whose data was included in the data 215. The ingestion engine 110 may receive the data 216, perform any suitable processing on the data 216, and store the new data from the data 216 as mutable data chunk 207 which may be part of the mutable data 151 for the database 150. The ingestion engine 110 may also determine that the mutable data chunk 205 was initially stored long enough ago to become immutable data. The mutable data chunk 205 may have been initially stored 72 hours ago. The ingestion engine 110 may cause the mutable data chunk 205 to become the immutable data chunk 163, for example, through moving or copying the mutable data chunk 205, updating an indicator in metadata for the mutable data chunk 205, changing pointers that point to the mutable data chunk 205, or in any other suitable manner. The immutable data chunk 163 may be part of the of the immutable data 161 for the database 150. The immutable data chunk 163 may no longer be subject to being updated with any data subsequently received at the computing device 100 and processing by the ingestion engine 110. The mutable data chunk 206 may have been initially stored 48 hours ago, the mutable data chunk 154 may have been initially stored 24 hours ago, and the mutable data chunk 207 may have been initially stored zero hours ago at the time the ingestion engine 110 stores the mutable data chunk 207 in the storage 140, and may all be mutable and subject to being updated by the ingestion engine 110 while part of the mutable data 151.

Figure 2G:
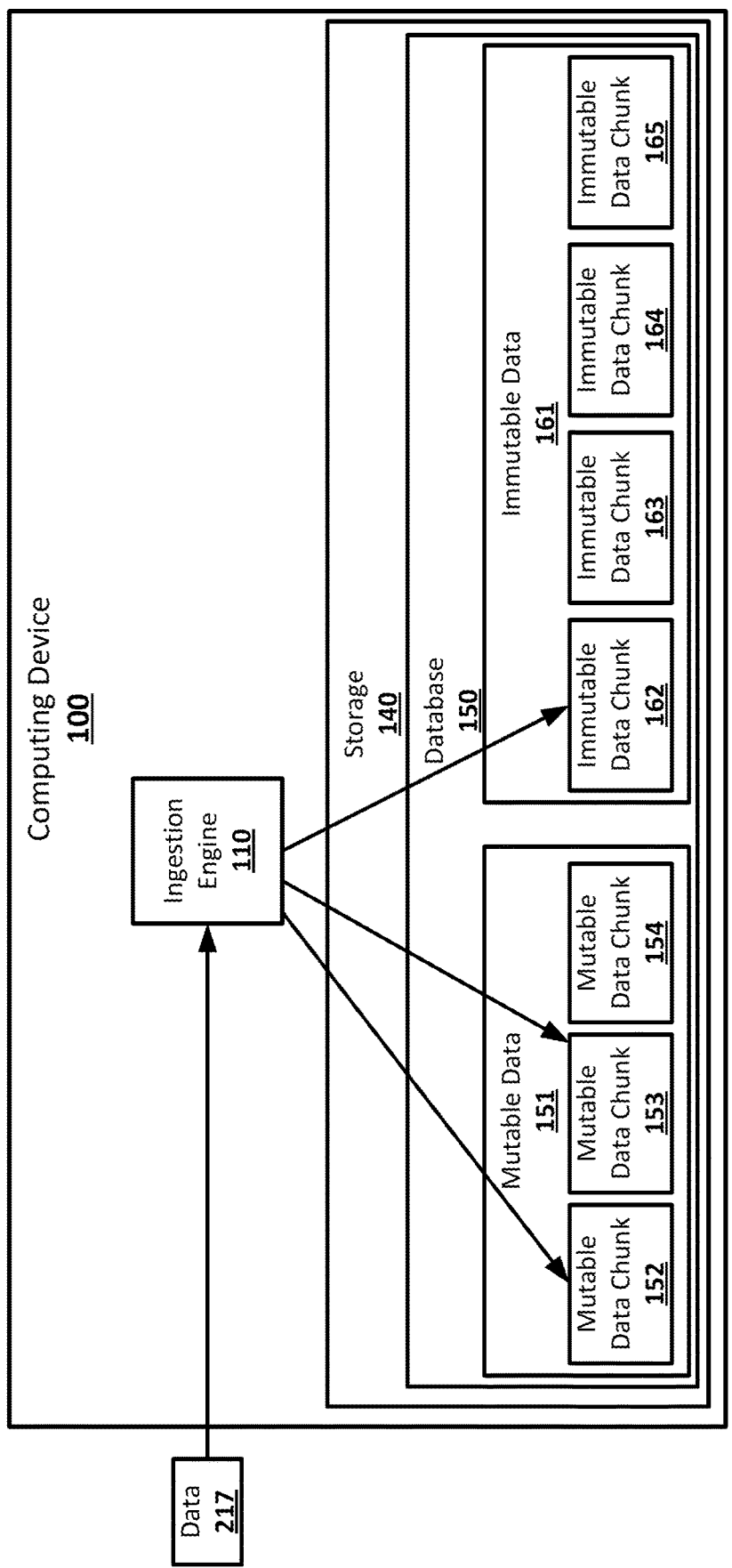
FIG. 2G shows an example arrangement suitable for mutable data ingestion and storage according to an implementation of the disclosed subject matter.

FIG. 2G shows an example arrangement suitable for mutable data ingestion and storage according to an implementation of the disclosed subject matter. Data 217 may be received at the computing device 100. The data 217 may be received from any suitable source, including another computing device or system, or a storage device accessible to the computing device 100, and may be from the same source as the data 211, 212 213, 214, 215, and 216. The data 217 may be received after a specified interval, for example, a 24-hour interval, has passed since the receipt of the data 216. The data 217 may include data, such as records, for database tables of a database, for example, the database 150. The data 217 may include new data for the database 150 from over a specified time period, such as, for example, data from a 24-hour time period, such as the 24-hour time period that follows the 24-time period whose data was included in the data 216, and may also include a snapshot update for the data 216, which may include updated data and may also remove data from the mutable data chunk data 207. The ingestion engine 110 may receive the data 217, perform any suitable processing on the data 217, store the new data from the data 217 as mutable data chunk 152 which may be part of the mutable data 151 for the database 150, and may apply the snapshot update to the mutable data chunk 207, replacing the mutable data chunk 207 with the mutable data chunk 153. The mutable data chunk 153 may include all of the data from the mutable data chunk 207, including data updated by the snapshot update, except for data removed by the snapshot update. For example, the snapshot update may include changes to records in the mutable data chunk 207. These changes may be reflected in the mutable data chunk 153. The snapshot update may remove records from the mutable data chunk 207. These records may be absent from the mutable data chunk 153. The ingestion engine 110 may also determine that the mutable data chunk 206 was initially stored long enough ago to become immutable data. The mutable data chunk 206 may have been initially stored 72 hours ago. The ingestion engine 110 may cause the mutable data chunk 206 to become the immutable data chunk 162, for example, through moving or copying the mutable data chunk 206, updating an indicator in metadata for the mutable data chunk 206, changing pointers that point to the mutable data chunk 206, or in any other suitable manner. The immutable data chunk 162 may be part of the of the immutable data 161 for the database 150. The immutable data chunk 162 may no longer be subject to being updated with any data subsequently received at the computing device 100 and processing by the ingestion engine 110. The mutable data chunk 154 may have been initially stored 48 hours ago, the mutable data chunk 153 may have been initially stored 24 hours ago as the mutable data chunk 207, and the mutable data chunk 154 may have been initially stored zero hours ago at the time the ingestion engine 110 stores the mutable data chunk 152 in the storage 140, and may all be mutable and subject to being updated by the ingestion engine 110 while part of the mutable data 151.

Figure 3A:
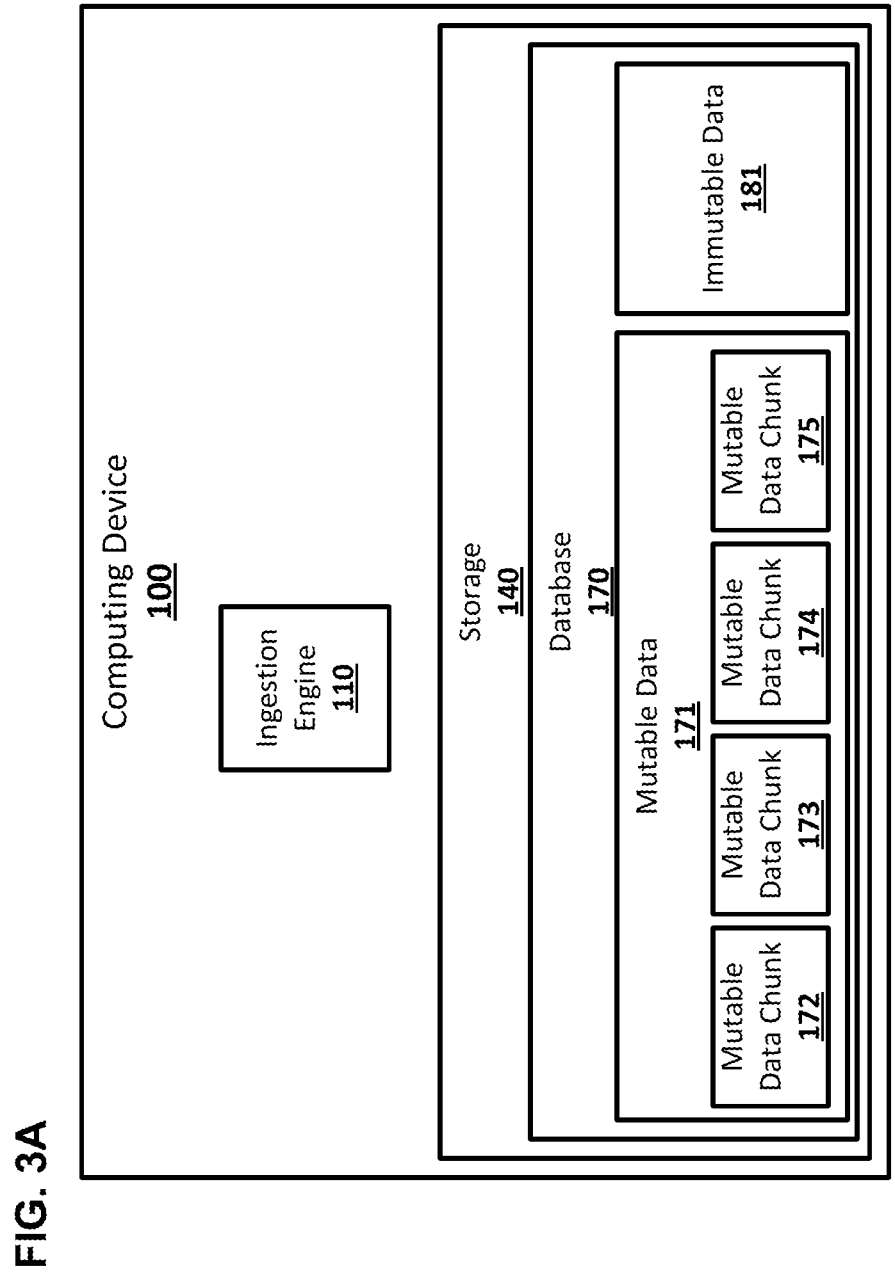
FIG. 3A shows an example arrangement suitable for mutable data ingestion and storage according to an implementation of the disclosed subject matter.

FIG. 3A shows an example arrangement suitable for mutable data ingestion and storage according to an implementation of the disclosed subject matter. In some implementations, immutable data may be stored undifferentiated, and data that becomes immutable may be appended to the already stored immutable data. For example, the database 170 may include the immutable data 181, which may be undifferentiated, for example, not divided into discrete data chunks.

Figure 3B:
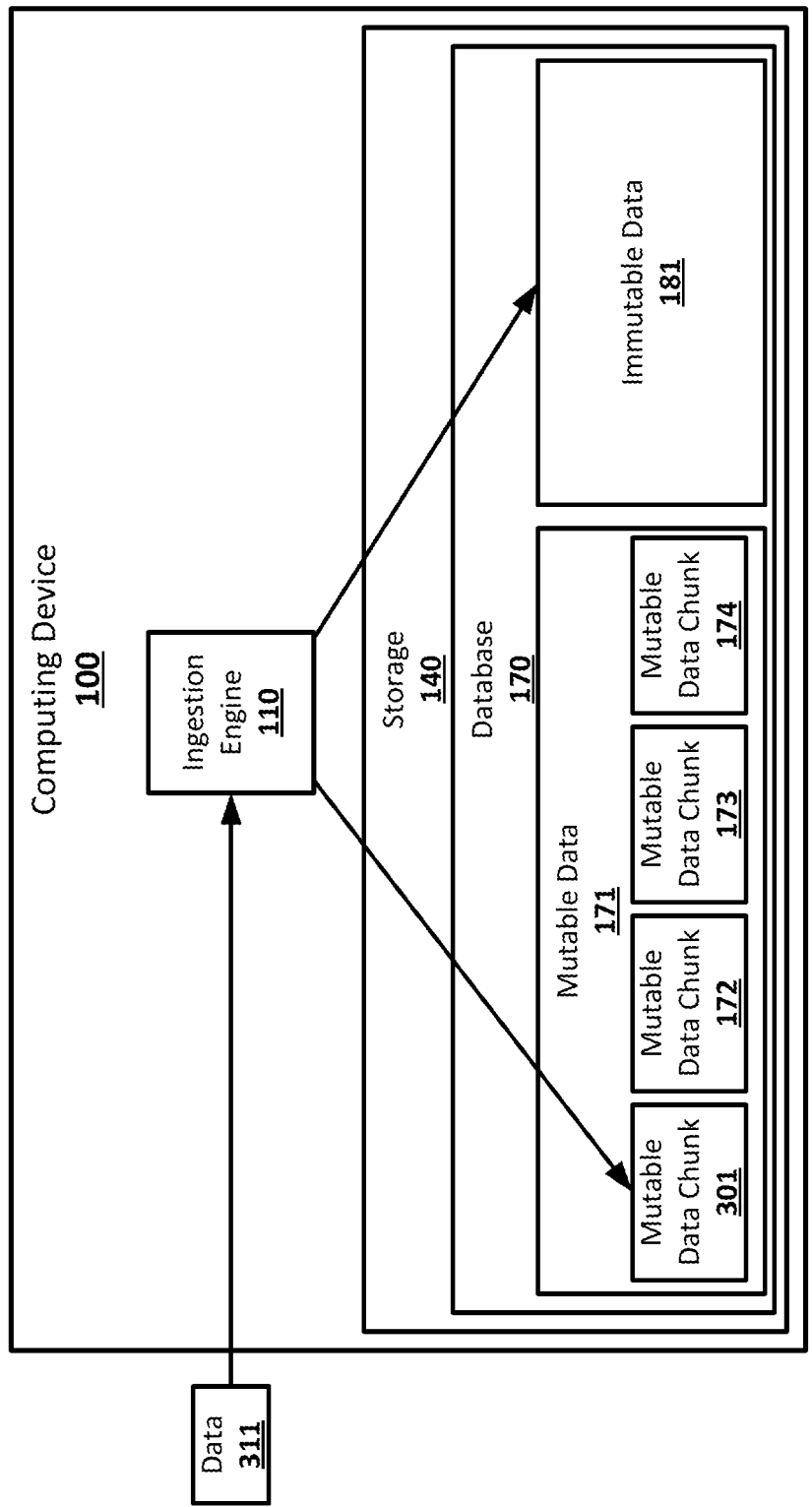
FIG. 3B shows an example arrangement suitable for mutable data ingestion and storage according to an implementation of the disclosed subject matter.

FIG. 3B shows an example arrangement suitable for mutable data ingestion and storage according to an implementation of the disclosed subject matter. Data 311 may be received at the computing device 100. The data 311 may be received from any suitable source, including another computing device or system, or a storage device accessible to the computing device 100. The data 311 may be received after a specified interval, for example, a 24-hour interval, has passed since the previous receipt of data for the database 170. The data 311 may include data, such as records, for database tables of a database, for example, the database 170. The data 311 may include new data for the database 170 from over a specified time period, such as, for example, data from a 24-hour time period, such as the 24-hour time period that follows the 24-time period whose data was stored in the mutable data chunk 172. The ingestion engine 110 may receive the data 311, perform any suitable processing on the data 311, and store the new data from the data 311 as mutable data chunk 301 which may be part of the mutable data 171 for the database 170. The ingestion engine 110 may also determine that the mutable data chunk 175 was initially stored long enough ago to become immutable data. The mutable data chunk 175 may have been initially stored 72 hours ago as the mutable data chunk 202. The ingestion engine 110 may cause the mutable data chunk 175 to become immutable data by appending the mutable data chunk 175 to the immutable data 181. The ingestion engine 110 may append the mutable data chunk 175 to the immutable data 181 in any suitable manner, for example, through moving or copying the mutable data chunk 175, updating an indicator in metadata for the mutable data chunk 175, changing pointers that point to the mutable data chunk 175. The data from the mutable data chunk 175 may no longer be subject to being updated with any data subsequently received at the computing device 100 and processing by the ingestion engine 110 after being appended to the immutable data 181.

FIG. 4A shows an example visualization suitable for mutable data ingestion and storage according to an implementation of the disclosed subject matter. The data 211 may be received. The data 211 may include records from a first 24-hour period, for example, from hours 1 to 24. The records may be from any suitable system that generates records, such as, for example, a clickstream system that generates records for clickstream events. The data for the first 24-hour period from the data 211 may be stored as the mutable data chunk 201 with the mutable data 151 for the database 150.

The data 212 may be received at a specified interval after the data 211, such as, for example, after 24 hours. The data 212 may include records from a second 24-hour period, for example, hours 25 to 48, and updated records from the first 24-hour period, for example, hours 1 to 24. The records may be from the same system that generated the records in the data 211. The data for the second 24-hour period from the data 212 may be stored as the mutable data chunk 202 with the mutable data 151 for the database 150. The data for the first 24-hour period from the data 212 may be used to update the mutable data chunk 201, for example, by applying the data as a snapshot update. The result of updating the mutable data chunk 201 may be stored as the mutable data chunk 203 with the mutable data 151 for the database 150.

The data 213 may be received at a specified interval after the data 212, such as, for example, after 24 hours. The data 213 may include records from a third 24-hour period, for example, hours 49 to 72, and updated records from the second 24-hour period, for example, hours 25 to 48. The records may be from the same system that generated the records in the data 211. The data for the third 24-hour period from the data 213 may be stored as the mutable data chunk 205 with the mutable data 151 for the database 150. The data for the second 24-hour period from the data 213 may be used to update the mutable data chunk 202, for example, by applying the data as a snapshot update. The result of updating the mutable data chunk 202 may be stored as the mutable data chunk 204 with the mutable data 151 for the database 150.

The data 214 may be received at a specified interval after the data 213, such as, for example, after 24 hours. The data 214 may include records from a fourth 24-hour period, for example, hours 73 to 96. The records may be from the same system that generated the records in the data 211. The data for the fourth 24-hour period from the data 214 may be stored as the mutable data chunk 206 with the mutable data 151 for the database 150. The mutable data chunk 203, having been initially stored 72 hours ago, which may be the specified age of data before it becomes immutable, may become the immutable data 165 in the immutable data chunk 161.

The data 215 may be received at a specified interval after the data 214, such as, for example, after 24 hours. The data 215 may include records from a fifth 24-hour period, for example, hours 97 to 120. The records may be from the same system that generated the records in the data 211. The data for the fifth 24-hour period from the data 215 may be stored as the mutable data chunk 154 with the mutable data 151 for the database 150. The mutable data chunk 204, having been initially stored 72 hours ago, which may be the specified age of data before it becomes immutable, may become the immutable data chunk 164 in the immutable data 161.

Figure 4B:
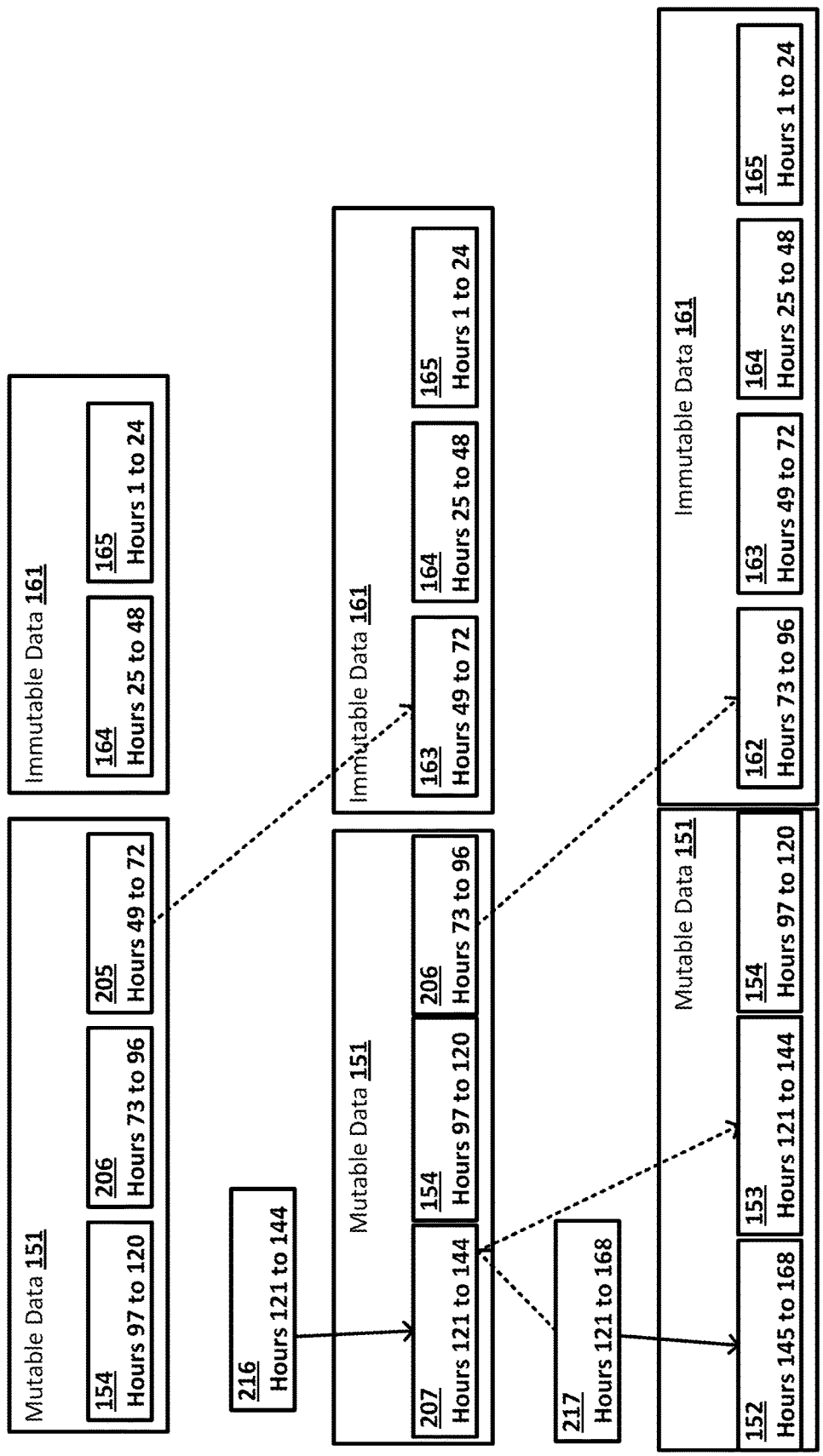
FIG. 4B shows an example visualization suitable for mutable data ingestion and storage according to an implementation of the disclosed subject matter.

FIG. 4B shows an example visualization suitable for mutable data ingestion and storage according to an implementation of the disclosed subject matter. The data 216 may be received. The data 216 may be received at a specified interval after the data 215, such as, for example, after 24 hours. The data 216 may include records from a sixth 24-hour period, for example, hours 121 to 144. The records may be from the same system that generated the records in the data 211. The data for the sixth 24-hour period from the data 216 may be stored as the mutable data chunk 207 with the mutable data 151 for the database 150. The mutable data chunk 205, having been initially stored 72 hours ago, which may be the specified age of data before it becomes immutable, may become the immutable data chunk 163 in the immutable data 161.

The data 217 may be received at a specified interval after the data 216, such as, for example, after 24 hours. The data 217 may include records from a seventh 24-hour period, for example, hours 145 to 168, and updated records from the sixth 24-hour period, for example, hours 121 to 144. The records may be from the same system that generated the records in the data 211. The data for the seventh 24-hour period from the data 217 may be stored as the mutable data chunk 152 with the mutable data 151 for the database 150. The data for the sixth 24-hour period from the data 217 may be used to update the mutable data chunk 207, for example, by applying the data as a snapshot update. The result of updating the mutable data chunk 207 may be stored as the mutable data chunk 153 with the mutable data 151 for the database 150. The mutable data chunk 206, having been initially stored 72 hours ago, which may be the specified age of data before it becomes immutable, may become the immutable data chunk 162 in the immutable data 161.

Figure 5:
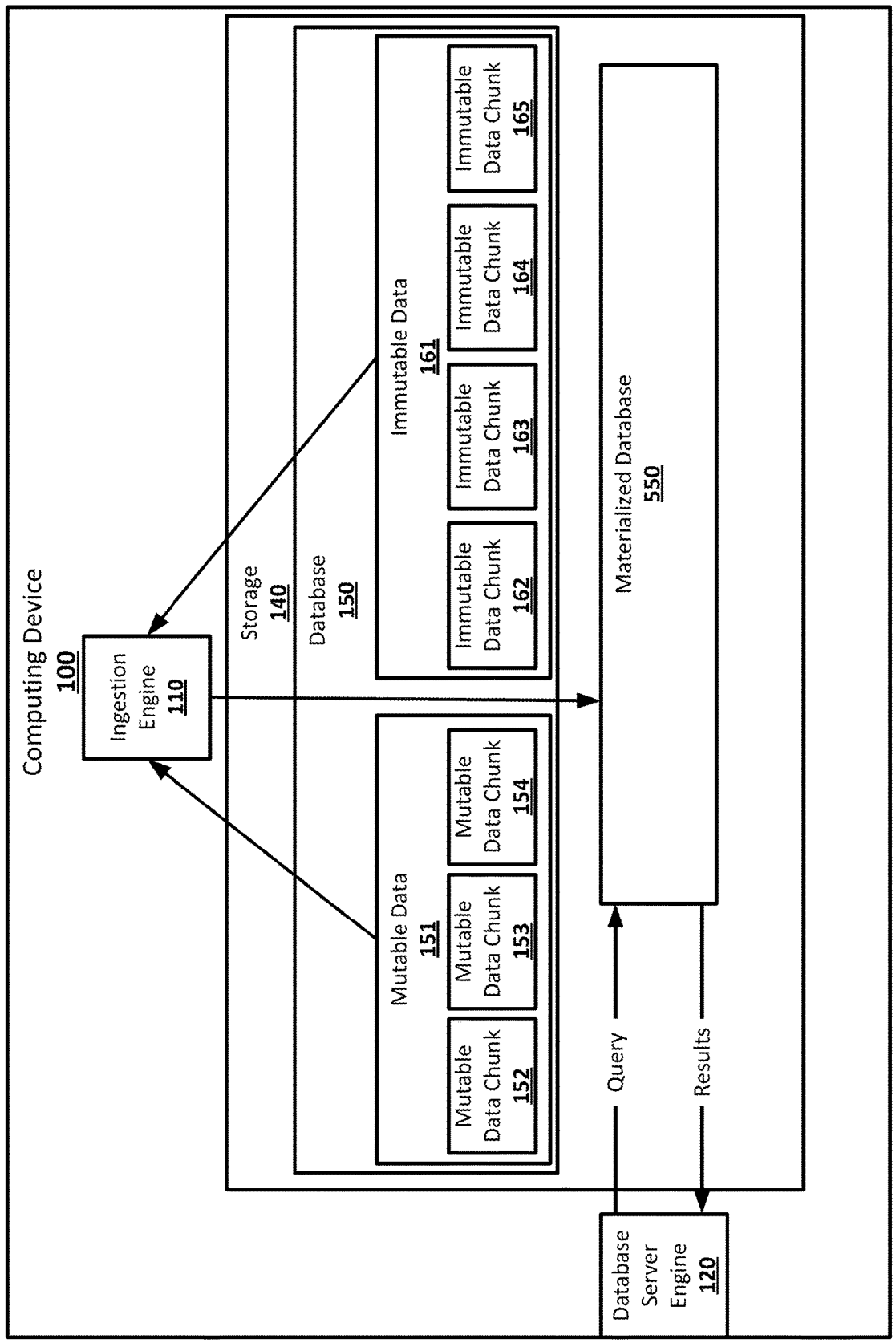
FIG. 5 shows an example arrangement suitable for mutable data ingestion and storage according to an implementation of the disclosed subject matter.

FIG. 5 shows an example arrangement suitable for mutable data ingestion and storage according to an implementation of the disclosed subject matter. The ingestion engine 110 may make the database 150 available for querying by the database server engine 120. At any suitable time, the database 150 may need to made available for the database serve engine 120 to query the most current set of data stored in the database 150, including the most data most recently received and added to the mutable data 151. The ingestion engine 110 may perform a merge operation on the mutable data chunks 152, 153, and 154 in the mutable data 151, and union operation on the immutable data chunks 162, 163, 164, and 165 in the immutable data 161. The ingestion engine 110 may then perform a union operation on the results of the merge operation performed on the mutable data chunks 152, 153, and 154 and the results of the union operation performed on the immutable data chunks 162, 163, 164, and 165 and store the results in the storage 140 as the materialized database 550. The materialized database 550 may include all of the data from the mutable data 151 and the immutable data 161, with the most current version of the mutable data 151. The data in the materialized database 550 may, for example, be records and schema for database tables. The database server engine 120 may run a query against the database tables of the materialized database 550 and may generate results of the query, which may be, for example, returned to a user or used in any other suitable manner.

Figure 6:
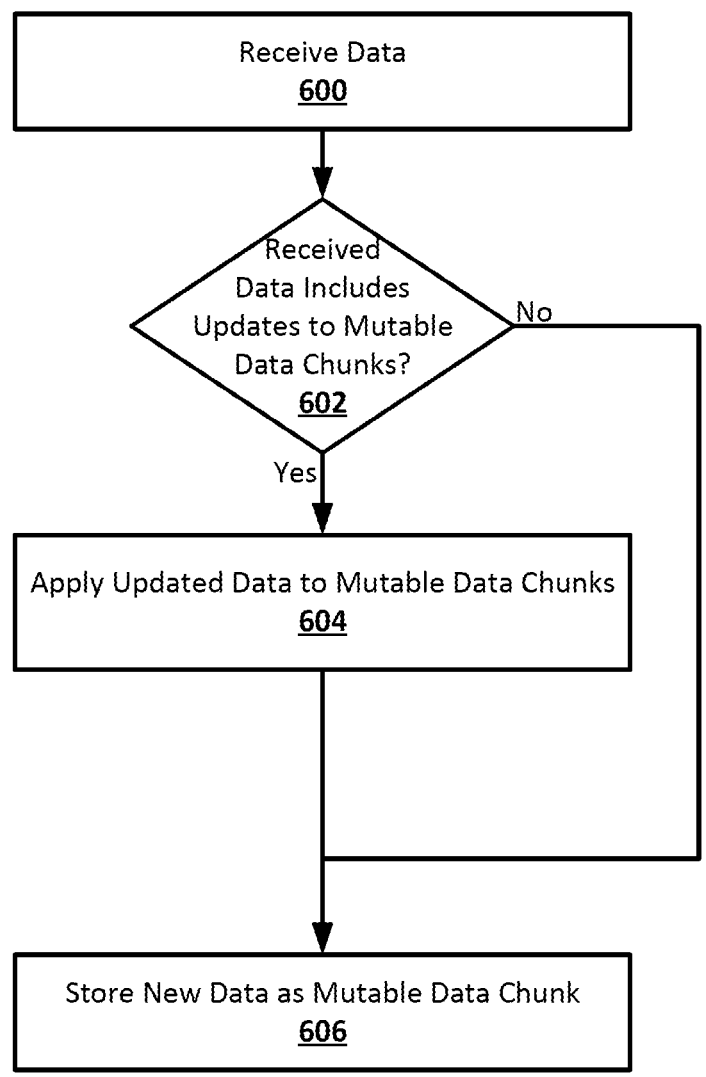
FIG. 6 shows an example procedure suitable for mutable data ingestion and storage according to an implementation of the disclosed subject matter.

FIG. 6 shows an example procedure suitable for mutable data ingestion and storage according to an implementation of the disclosed subject matter. At 600, data may be received. For example, data, such as the data 211, may be received by the computing device 100 and input to the ingestion engine 110. The received data may include data for a database, such as, for example, records from over a specified time period for any number of database tables. The data may be received from any suitable source, include other computing devices or systems, or storage devices accessible to the computing device 100.

At 602, if the received data includes updates to mutable data chunks, flow may proceed to block 604. Otherwise, flow may proceed to block 606. For example, the data received at the computing device 100, for example, the data 212, may include updated data for an already stored mutable data chunk, for example, the mutable data chunk 201, or the data received at the computing device 100, such as the data 214, may not include updated data for any mutable data chunks. The ingestion engine 100 may determine if received data includes updated data for an already stored mutable data chunk in any suitable manner, such as, for example, checking whether the received data includes data, such as records, that are for a time period from which records are already stored in a mutable data chunk.

At 604, updated data may be applied mutable data chunks. The ingestion engine 110 may, for example, apply any updated data from the received data to the mutable data chunks being updated as snapshot updates. For example, the ingestion engine 110 may apply updated data for the mutable data chunk 201 from the data 212 as a snapshot update, the result of which may be stored as the mutable data chunk 203. The mutable data chunk 203 may include data from the same period of time as the mutable data chunk 201, but may be updated, for example, to update and remove data that was originally stored in the mutable data chunk 201.

At 606, new data may be stored as a mutable data chunk. The ingestion engine 110 may, for example, store data from the received data that is not from a time period for which data is already stored in a mutable data chunk as a new mutable data chunk. For example, the ingestion engine 110 may store data from the data 212 that is not used to update the mutable data chunk 201 as the mutable data chunk 202 with the mutable data 151 of the database 150. The new data in the data 212 may be, for example, records from a time period immediately after the time period that the records stored in the mutable data chunk 201 are from.

Data for a database may be received at the computing device 100, as in 600, at regular intervals. For example, data for the database 150 may be received once every 24 hours, with the data 212 being received 24 hours after the data 211. The ingestion engine 110 may run a discrete process or thread, for example, the mutable data process, for handling data received at the computing device 100.

Figure 7:
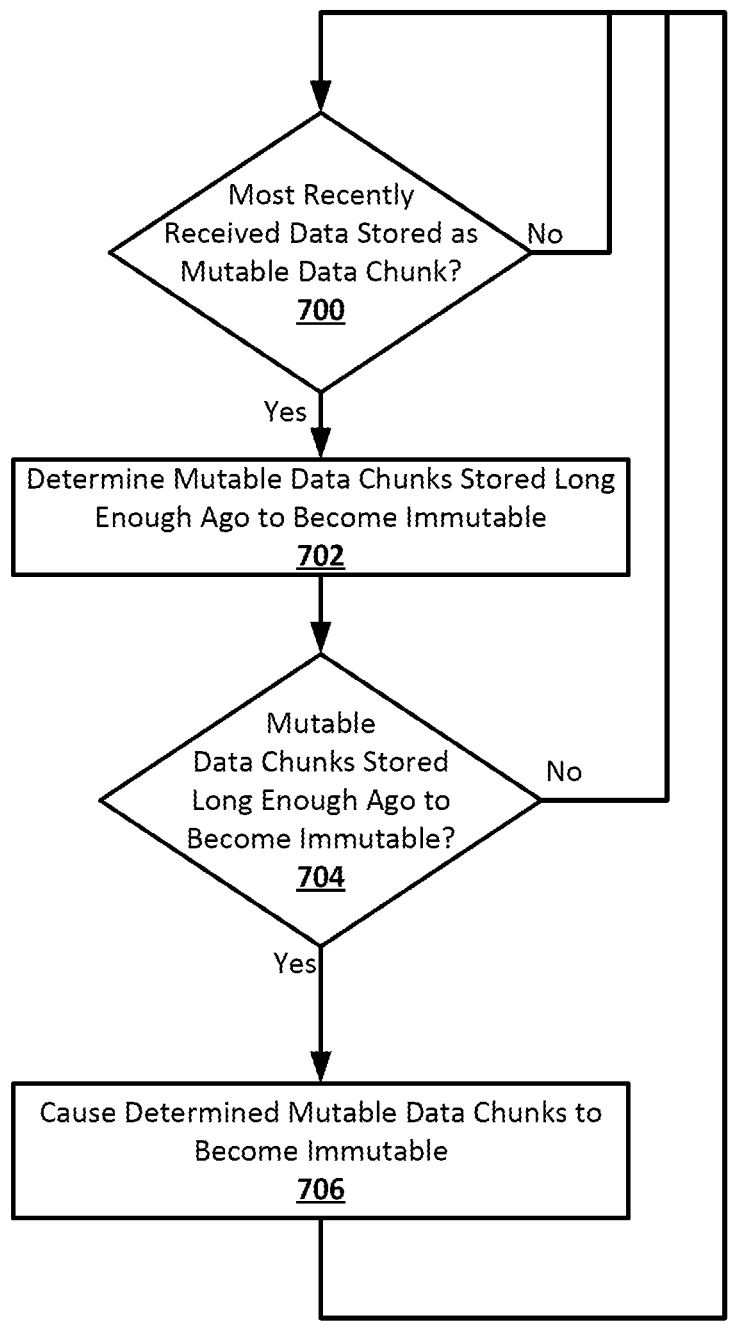
FIG. 7 shows an example procedure suitable for mutable data ingestion and storage according to an implementation of the disclosed subject matter.

FIG. 7 shows an example procedure suitable for mutable data ingestion and storage according to an implementation of the disclosed subject matter. At 700, if the most recently received data has been stored as mutable data chunk, flow may proceed to 702, otherwise flow may proceed back to 700. For example, the ingestion engine 110 may wait to determine whether any mutable data was initially stored long enough ago to become immutable data until the most recently received data has been stored as mutable data. This may synchronize the storing of new mutable data chunks and older mutable data chunks becoming immutable data chunks. The ingestion engine 110 may, for example, run a discrete process or thread, for example, the immutable data process, for causing mutable data to become immutable data, and the process or thread may have its activity tied to the discrete process or thread for handling data received at the computing device 100. The process or thread for causing mutable data to become immutable data may idle, or idle loop, until the process or thread for handling data received at the computing device 100 has stored the most recently received data as a mutable data chunk.

At 702, which mutable data chunks that have been stored long enough to become immutable may be determined. For example, the ingestion engine 110 may determine how long ago each of the mutable data chunks in the mutable data 151 were initially stored, and compare this to the specified amount of time ago mutable data needs to have been initially stored before it becomes immutable. The amount of time may be any suitable amount of time. For example, if the amount of time is 72 hours, the ingestion engine 110 may determine if any of the mutable data chunks in the mutable data 151 were initially stored at least 72 hours ago.

At 704, if there are any mutable data chunks that were stored long enough ago to become immutable, flow may proceed to 706, otherwise, flow may proceed back to 700. For example, the ingestion engine 110 may determine that there are no mutable data chunks in the mutable data 151 that were initially stored long enough to go to become immutable, in which case flow may proceed to 700 where the ingestion engine 110 may wait for more data to be received at the computing device 100 before checking the age of the mutable data chunks again.

At 706, the determined mutable data chunks may be caused to become immutable.

For example, the ingestion engine 110 may have determined at least one mutable data chunk, for example, the mutable data chunk 203, in the mutable data chunks 151 was initially stored long enough ago to become immutable. The ingestion engine 110 may cause the determined mutable data chunks, such as the mutable data chunk 203, to become immutable, for example, as the immutable data chunk 165. The ingestion engine 110 may, for example, copy or move the mutable data chunk 203 from the mutable data 151 to the immutable data 161, change an indicator in metadata for the mutable data chunk 203, change a pointer that points to the mutable data chunk 203, or cause the mutable data chunk 203 to become immutable, for example, as the immutable data chunk 165. Causing the mutable data chunk 203 to become immutable may result in the data in the mutable data chunk 203, now stored in the immutable data chunk 165, no longer being updatable by the ingestion engine 110 with data received at the computing device 100. After the ingestion engine 110 has caused the determined mutable data chunks to become immutable, flow may proceed back to 700.

Figure 8:
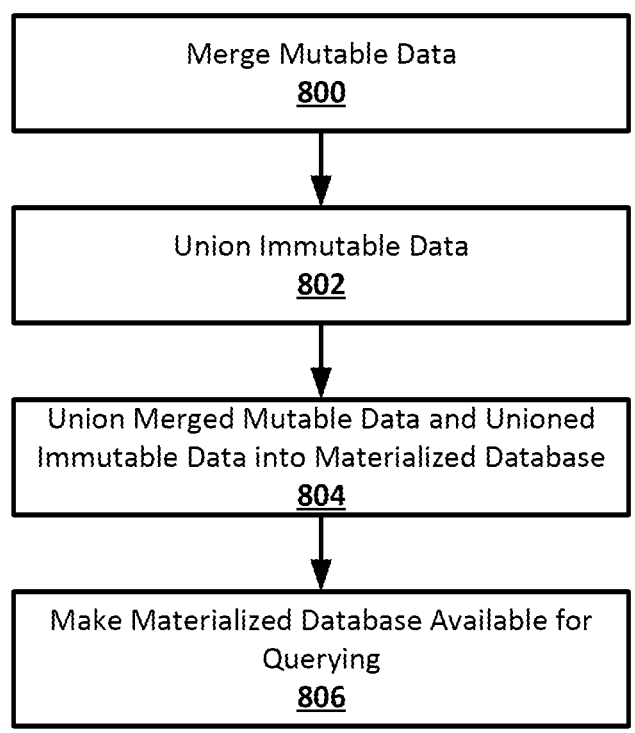
FIG. 8 shows an example procedure suitable for mutable data ingestion and storage according to an implementation of the disclosed subject matter.

FIG. 8 shows an example procedure suitable for mutable data ingestion and storage according to an implementation of the disclosed subject matter. At 800, mutable data may be merged. For example, the ingestion 110 may, in order to materialize the database 150, perform a merge operation on the mutable data 151, merging the mutable data chunks 152, 153, and 154 into merged mutable data.

At 802, immutable data may be unioned. For example, the ingestion engine 110 may perform a union operation on the immutable data 161, unioning the immutable data chunks 162, 163, 164, and 165 into unioned immutable data. In some implementations, mutable data chunks may be made immutable by appending them to the immutable data, as with, for example, the immutable data 181, and the ingestion engine 110 may not need to union the immutable data to materialize the database, for example, the database 170.

At 804, the merged mutable data and unioned immutable data may be unioned. For example, the ingestion engine 110 may perform a union operation on the merged mutable data and the unioned immutable data, unioning them into the materialized database 550. The materialized database 550 may be a materialization of the database 150, including the data, for example, records, that are current as of the time the merge operation is performed on the mutable data 151 and the union operation is performed on the immutable data 161, and any schema for database tables formed from the data.

At 804, the materialized data chunk may be made available for querying. For example, the materialized database 550 may be made available for the database server engine 120 to run queries against. The materialized database 550 may, for example, be stored in the storage 140, in volatile or non-volatile memory, and may remain queryable until either the materialized database 550 is considered out of date, or a new materialized database is generated by the ingestion 110 to materialize the database 150, for example, after new data has been added to the database 150.

Figure 9:
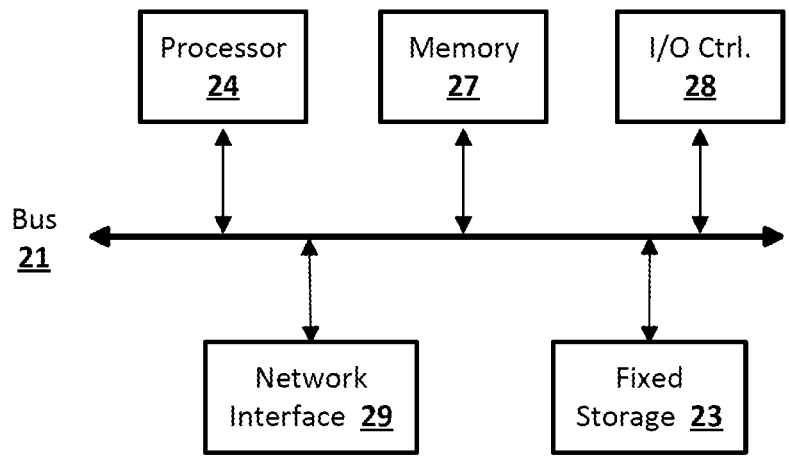
FIG. 9 shows a computer according to an embodiment of the disclosed subject matter.

Embodiments of the presently disclosed subject matter may be implemented in and used with a variety of component and network architectures. FIG. 9 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input- Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 10.

Many other devices or components (not shown) may be connected in a similar manner, such as document scanners, digital cameras, auxiliary, supplemental, or backup systems, or the like. Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 10:
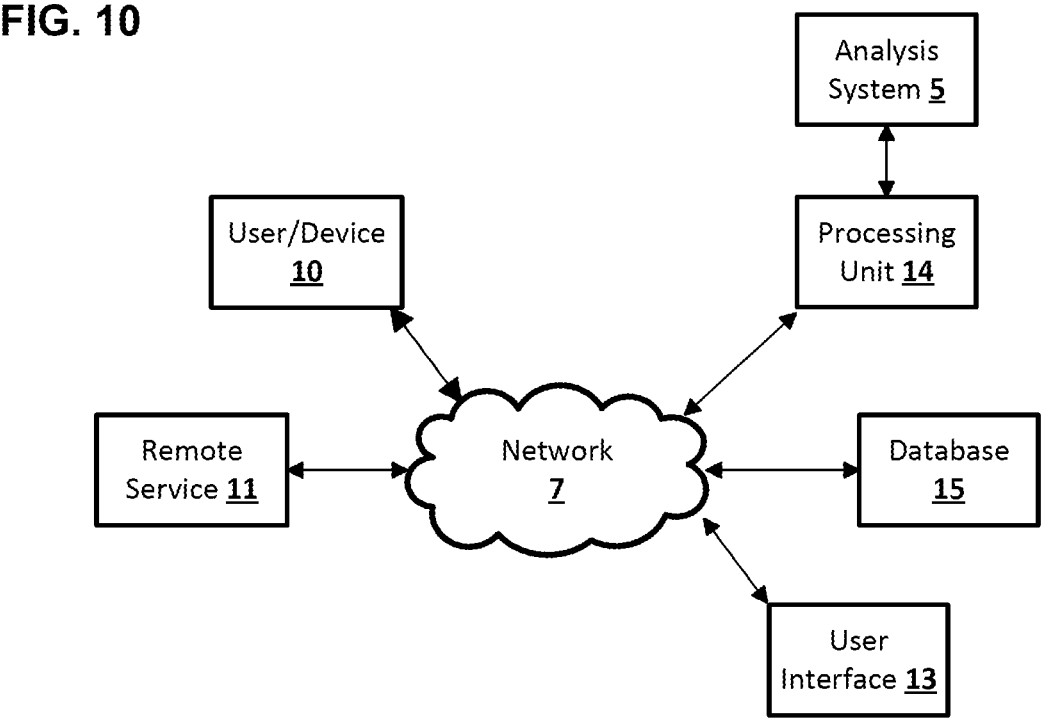
FIG. 10 shows a network configuration according to an embodiment of the disclosed subject matter.

FIG. 10 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database table 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database table 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database table 15 and/or user interface 13. In some arrangements, an analysis system 5 may provide back-end processing, such as where stored or acquired data is pre-processed by the analysis system 5 before delivery to the processing unit 14, database table 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   performing a merge operation on two or more mutable data chunks of a database to generate merged mutable data;
   performing a union operation on two or more immutable data chunks of the database to generate unioned immutable data;
   performing a union operation on the merged mutable data and the unioned immutable data to generate a materialized database; and
   making the materialized database available to be queried.

2. The method of claim 1, wherein the two or more immutable data chunks are not updatable with any additional data for the database received at the computing device.

3. The method of claim 1, wherein the two or more mutable data chunks are updateable with additional data for the database received at the computing device.

4. The method of claim 1, wherein the materialized database comprises a database table comprising records from one of the two or more mutable data chunks and one of the two or more immutable data chunks.

5. The method of claim 1, wherein the materialized database comprises records of the database that are current as of the time the merge operation is performed on the two or more mutable data chunks.

6. The method of claim 1, wherein the materialized database comprises schema for database tables formed from data in the two or mutable data chunks and the two or more immutable data chunks.

7. The method of claim 1, wherein the two or more immutable data chunks were previously stored as mutable data chunks that were caused to become immutable data chunks based on a determination that the mutable data chunks had been stored as mutable data chunks for at least a specified amount of time.

8. A computer-implemented system comprising:
   a storage, and
   a processor that performs a merge operation on two or more mutable data chunks of a database to generate merged mutable data,
   performs a union operation on two or more immutable data chunks of the database to generate unioned immutable data,
   performs a union operation on the merged mutable data and the unioned immutable data to generate a materialized database, and
   makes the materialized database available to be queried.

9. The system of claim 8, wherein the two or more immutable data chunks are not updatable with any additional data for the database received at the computing device.

10. The system of claim 8, wherein the two or more mutable data chunks are updateable with additional data for the database received at the computing device.

11. The system of claim 8, wherein the materialized database comprises a database table comprising records from one of the two or more mutable data chunks and one of the two or more immutable data chunks.

12. The system of claim 8, wherein the materialized database comprises records of the database that are current as of the time the merge operation is performed on the two or more mutable data chunks.

13. The system of claim 8, wherein the materialized database comprises schema for database tables formed from data in the two or mutable data chunks and the two or more immutable data chunks.

14. The system of claim 8, wherein the two or more immutable data chunks were previously stored as mutable data chunks that were caused to become immutable data chunks based on a determination that the mutable data chunks had been stored as mutable data chunks for at least a specified amount of time.

15. A system comprising: one or more computers and one or more storage devices storing instructions which are operable, when executed by the one or more computers, to cause the one or more computers to perform operations comprising:
comprising:
performing a merge operation on two or more mutable data chunks of a database to generate merged mutable data;
performing a union operation on two or more immutable data chunks of the database to generate unioned immutable data;
performing a union operation on the merged mutable data and the unioned immutable data to generate a materialized database; and
making the materialized database available to be queried.

16. The system of claim 15, wherein the two or more immutable data chunks are not updatable with any additional data for the database received at the computing device.

17. The system of claim 15, wherein the two or more mutable data chunks are updateable with additional data for the database received at the computing device.

18. The system of claim 15, wherein the materialized database comprises a database table comprising records from one of the two or more mutable data chunks and one of the two or more immutable data chunks.

19. The system of claim 15, wherein the materialized database comprises records of the database that are current as of the time the merge operation is performed on the two or more mutable data chunks.

20. The system of claim 15, wherein the materialized database comprises schema for database tables formed from data in the two or mutable data chunks and the two or more immutable data chunks.

* * * * *